United States Patent [19] [11] Patent Number: 4,809,344
Peppers et al. [45] Date of Patent: Feb. 28, 1989

[54] APPARATUS FOR PREPROCESSING OF CHARACTER RECOGNITION

[75] Inventors: Norman A. Peppers, Belmont; James R. Young, Palo Alto; Gerald A. Pierce, Redwood City, all of Calif.; Hisami Nishi; Kazuo Katsuki, both of Osaka, Japan

[73] Assignee: Nippon Sheet Glass Co., Ltd., Osaka, Japan

[21] Appl. No.: 48,229

[22] Filed: May 11, 1987

[51] Int. Cl.⁴ .............................................. G06K 9/74
[52] U.S. Cl. ......................................... 382/32; 382/16; 382/33; 382/48
[58] Field of Search ...................... 382/1, 9, 10, 16, 18, 382/27, 30–35, 41, 42, 48, 45, 51, 58, 61, 63, 65, 67, 68; 235/454, 436, 439, 440; 358/225, 226, 288

[56] References Cited

U.S. PATENT DOCUMENTS

| | | | |
|---|---|---|---|
| 3,829,832 | 8/1974 | Kawasaki | 382/31 |
| 3,877,801 | 4/1975 | MacGovern | 350/167 |
| 3,905,019 | 9/1975 | Aoki et al. | 382/31 |
| 4,465,939 | 8/1984 | Tamura | 382/67 |
| 4,559,643 | 12/1985 | Brogardh | 382/65 |
| 4,706,127 | 11/1987 | Nobuta | 358/288 |

Primary Examiner—Leo H. Boudreau
Assistant Examiner—Jose L. Couso
Attorney, Agent, or Firm—Woodcock Washburn Kurtz Mackiewicz & Norris

[57] ABSTRACT

In an apparatus for preprocessing of character recognition so as to obtain data necessary for character recognition, page segmentation is performed by simultaneously extracting a plurality of features, separation between lines, separation between characters, and separation between the lines and the characters are simultaneously performed, and a calculation time for normalizing the separated individual characters can be reduced, thereby performing proprocessing required for character recognition systematically at high speed.

8 Claims, 7 Drawing Sheets

APPARATUS FOR PREPROCESSING OF CHARACTER RECOGNITION

BACKGROUND OF THE INVENTION

1. Field of the Invention

The present invention relates to an apparatus for preprocessing of character recognition so as to obtain data necessary for character recognition.

2. Description of the Prior Art

Character recognition in a document page requires page segmentation for dividing a document page according to an identical format such as a vertical or lateral writing format, separation between lines within a divided area, separation between characters within a separated line, and normalization of separated individual characters, prior to character recognition.

However, no conventional apparatuses are known to systematically at high speed perform preprocessing for character recognition, i.e., page segmentation, separation of lines and separation of characters, and normalization of individual characters.

SUMMARY OF THE INVENTION

An apparatus for preprocessing of character recognition according to the present invention comprises dividing means for dividing an area within a page into a plurality of areas, multiplying means for multiplying one of the plurality of areas into a plurality of images, feature extracting means for extracting features of the area by optically detecting the presence or absence of a correlation between each of pairs of the plurality of images and a plurality of different masks, a plurality of photosensor arrays each of which has a plurality of aligned light-receiving elements and which have different alignment directions of the light-receiving elements and are respectively paired with the multiple images, first and second image sensors for reading characters within the page in a predetermined scanning direction, moving means for moving relatively the characters and the first and second image sensors in a direction different from the scanning direction, calculating means for calculating a size of the character along a moving direction on the basis of an output from the first image sensor and control means for controlling a scanning frequency of the second image sensor on the basis of the calculated size, wherein the area within the page is divided until each of the areas has a single feature, and a beam from the divided area with a single feature is incident on said plurality of sensor arrays, the lines and the characters in the divided area are separated on the basis of a density distribution represented by detection outputs from said light-receiving elements, and the separated character is normalized by the second image sensor along the moving direction.

In the apparatus for preprocessing of character recognition according to the present invention, one of the areas within the page is multiplied into a plurality of images, and different features are extracted from the multiple images, respectively. Therefore, a plurality of features can be simultaneously extracted.

In addition, the presence or absence of the correlation between the image and the mask is optically detected to extract the feature of the divided area. Therefore, the feature corresponding to the shape of the mask can be extracted.

The plurality of photosensors have different alignment directions of the light-receiving elements and are paired with the plurality of images, respectively. Information associated with lines and information associated with characters can be instantaneously obtained. The separation between the lines, the separation between the characters, and the separation between the lines and the characters can be simultaneously performed.

The plurality of photosensor arrays having different alignment directions of the light-receiving elements thereof are respectively paired with the plurality of images. Therefore, the same processing as in noninclined lines and characters can be performed for inclined lines and characters.

The character which is normalized for the relative moving direction of the character and the first and second image sensors can be directly output from the second image sensor. Therefore, the calculation time can be shortened as compared with the conventional case wherein the character is normalized by calculations in both of the scanning and moving directions.

In the apparatus for preprocessing of character recognition according to the present invention, a plurality of features can be simultaneously extracted to achieve high-speed page segmentation.

Furthermore, the feature corresponding to the mask shape can be extracted. Therefore, page segmentation can be performed to obtain a desired feature by using a desired mask.

The information associated with lines and information associated with characters can be instantaneously obtained. Furthermore, the separation between the lines, the separation between the characters, and the separation between the lines and the characters can be simultaneously performed. And furthermore, the same processing as in noninclined lines and characters can be performed for inclined lines and characters. Therefore, the lines and the characters can be separated at high speed.

The separated individual characters can be normalized within a short calculation period.

Preprocessing required for character recognition, therefore, can be systematically achieved at high speed.

DETAILED DESCRIPTION OF THE PREFERRED EMBODIMENT

A preferred embodiment of the present invention will be described with reference to FIGS. 1 to 11.

Figure 1:
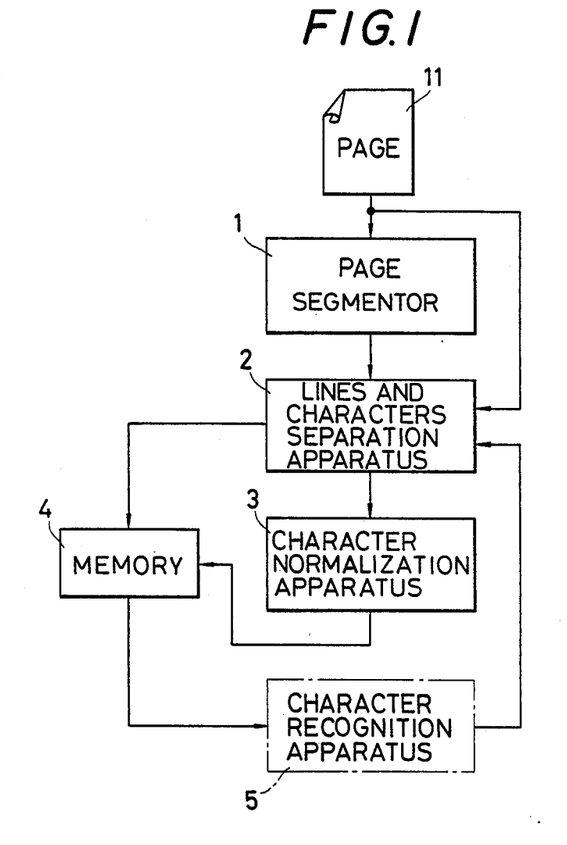
FIG. 1 is a schematic block diagram of an apparatus for preprocessing of character recognition according to an embodiment of the present invention.

FIG. 1 shows a schematic arrangement of an apparatus for preprocessing of character recognition. In this embodiment, a format of a page 11 as a document is discriminated by a page segmentor 1 to be a vertically written document, a laterally written document, a graph, or the like.

If a plurality of formats are mixed in the page 11, the page 11 is divided into areas each having a single format. Each area is recognized by a coordinate system. Pieces of information, i.e., the format and the coordinate data of each area, obtained by the page segmentor 1 are transferred to a lines and characters separation apparatus 2.

The lines and characters separation apparatus 2 separates the lines within each area having a single format on the basis of information transferred from the page segmentor 1 and calculates coordinates of each line. The characters in each separated line are separated from each other to obtain coordinates of each character.

The coordinate data of each separated character is transferred to a character normalization apparatus 3. The character normalization apparatus normalizes each character.

Various pieces of information and the normalized characters, both of which are obtained as described above, are transferred to a character recognition apparatus 5 through a memory 4.

If the character recognition apparatus 5 fails in character recognition, control returns to the lines and characters separation apparatus 2. The characters are then separated from each other again. In this case, separation of the characters is performed by comparing the current separation operation with the previous separation operation so as to prevent the current result from being the same as the previous result.

The page segmentor 1, the lines and characters separation apparatus 2, and the character normalization apparatus 3 will be described below.

Figure 2:
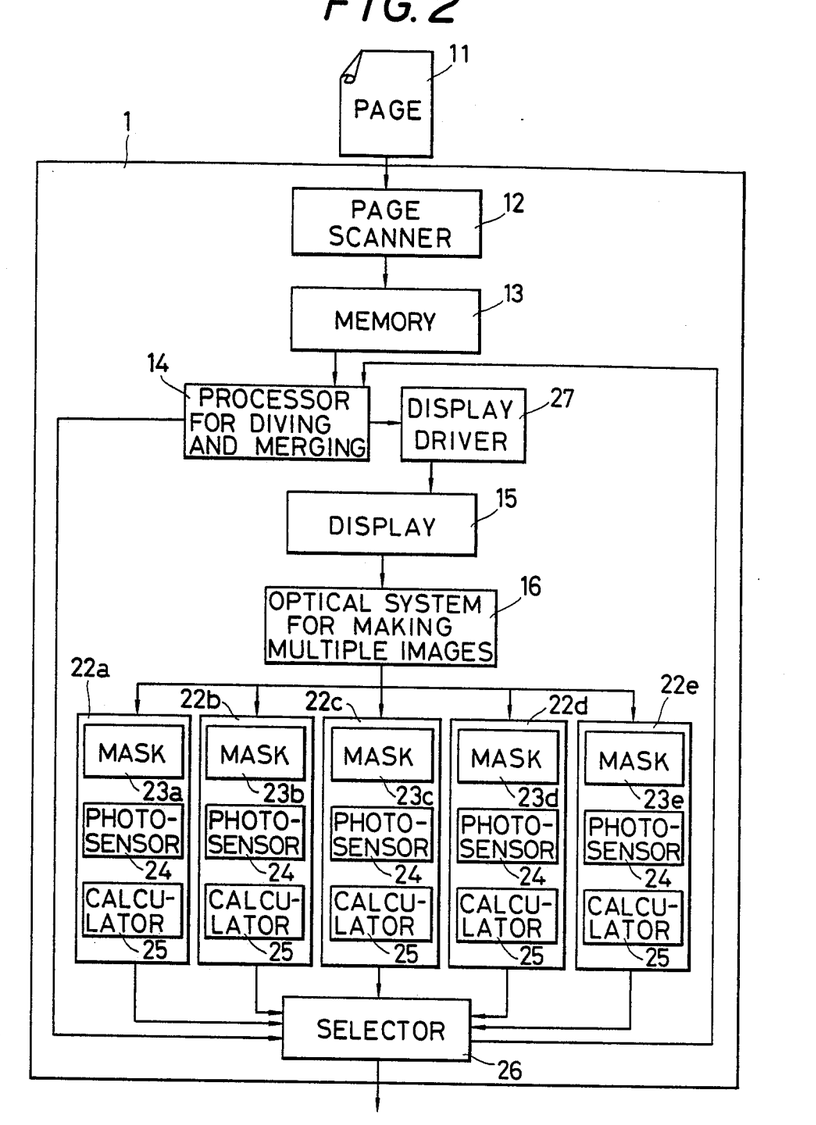
FIG. 2 is a block diagram of a page segmentor.

FIG. 2 shows the overall arrangement of the page segmentor 1. In the page segmentor 1, the page 11 as a document is scanned by a page scanner 12, and the read page 11 is recorded in a memory 13.

The page scanner 12 need not have a high resolution enough to discriminate the shape of characters constituting the document, but can have a resolution enough to discriminate the presence or absence of the characters.

The page 11 recorded in the memory 13 is divided into, e.g., four areas of first to fourth quadrants by a processor 14 for dividing and merging. One of the divided areas is transferred from a display driver 27 to a display 15 and is displayed on the display 15.

Figure 3:
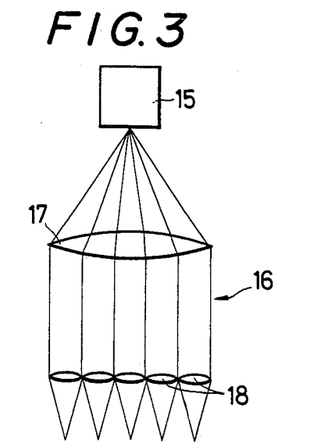
FIG. 3 is a side view of an optical system for making multiple images.

An output from the display 15 is input to an optical system 16 for making multiple images. The optical system 16 comprises, e.g., a single convex lens 17 having a relatively large aperture size and a plurality of convex lenses 18 each having a relatively small aperture size.

The display 15 is located at a focal point of the convex lens 17 on the side opposite to the convex lenses 18. Images 21 (FIG. 4) of the area within the page 11 are formed at focal points of the convex lenses 18 on the side opposite to the convex lens 17. The number of images 21 is the number of convex lenses 18.

Figure 4:
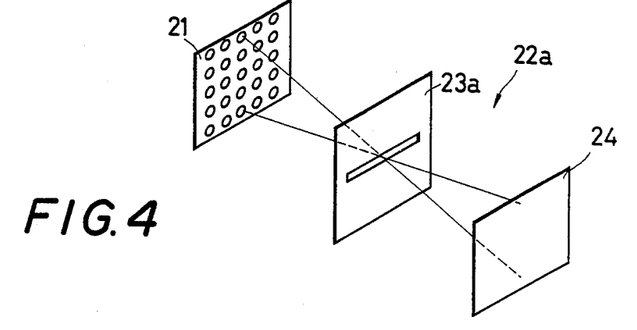
FIG. 4 is a schematic perspective view of a correlation calculator.

In this embodiment, the multiple images 21 are simultaneously input to five correlation calculators 22a to 22e. Each of the correlation calculators 22a to 22e comprises a corresponding one of masks 23a to 23e, a photosensor 24, and a calculator 25. The correlation calculators 22a to 22e are simultaneously operated.

Figure 5A:
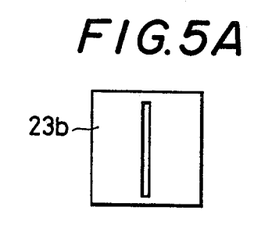
FIGS. 5A and 5B are front views of masks, respectively.
Figure 5B:
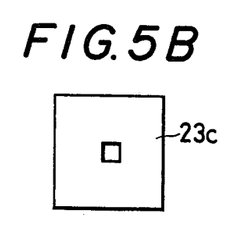

The masks 23a and 23b are masks for detecting laterally and vertically written documents, respectively, as shown in FIGS. 4 and 5A. The mask 23c is a mask corresponding to an expected character size, as shown in FIG. 5B. The masks 23d and 23e are masks corresponding to character sizes different from that of the mask 23c.

If a document as a multiple image 21 consists of vertically written characters, the calculator 25 in the correlation calculator 22b outputs a signal representing the presence of a correlation. In addition, in cooperation with the correction calculators 22c to 22e, a bar graph is also discriminated.

Information such as coordinates of the divided areas is transferred from the processor 14 for dividing and merging to a selector 26. The selector 26 discriminates the divided area and its feature on the basis of the transferred information and output signals from the correlation calculators 22a to 22e.

If one area has a plurality of features, e.g., vertically and laterally written characters, the processor 14 for dividing and merging performs division of the area again. By repeating the above operation, the page 11 is repeatedly divided until one area has a single feature.

The single feature assigned to each area and its coordinates are discriminated by the above operations. Finally, the areas having the same feature are merged by the processor 14 for dividing and merging.

Instead of the masks 23a to 23c shown in FIGS. 4 and 5, a large number of masks having slits inclined at any angles may be used to discriminate an inclined character string or an inclined line of characters.

By using masks having correlations with any figures or tables, corresponding figures or tables can be discriminated.

Figure 6:
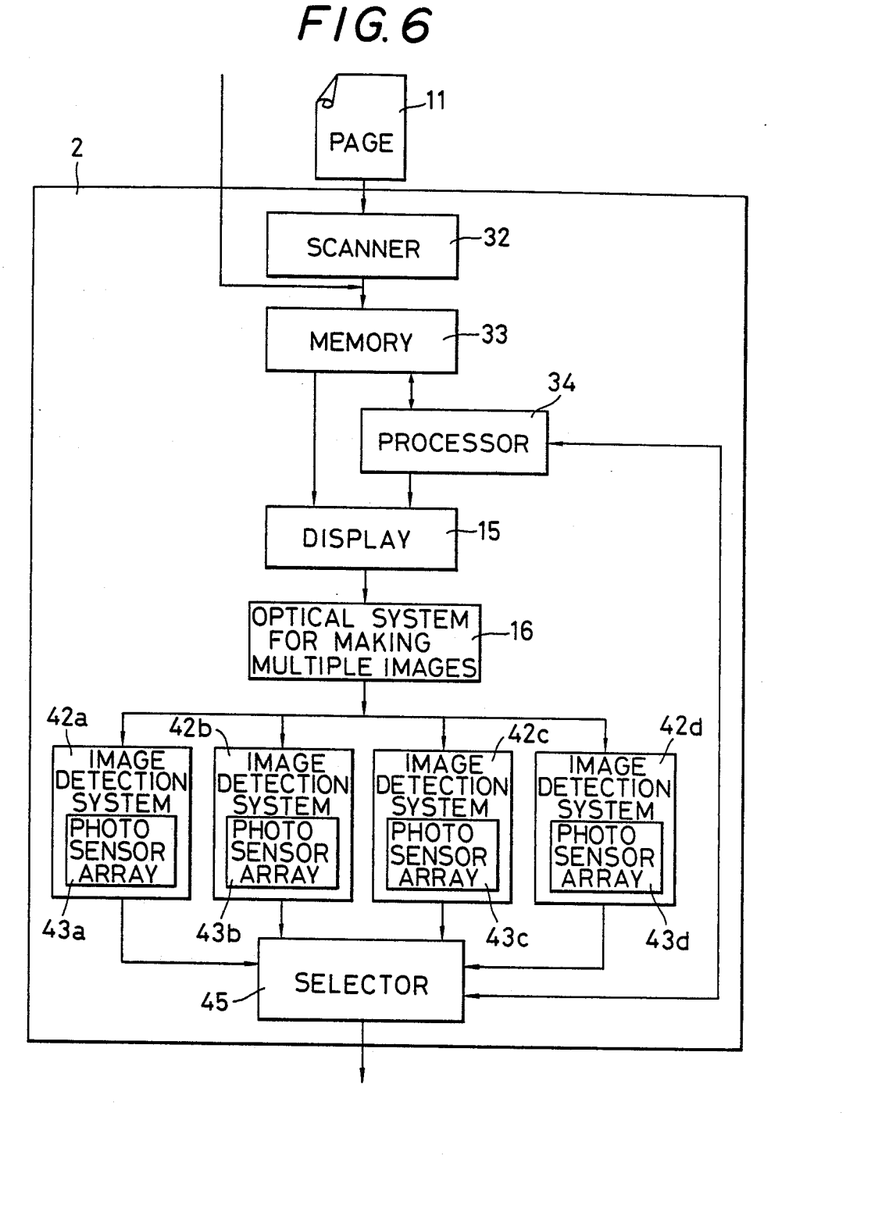
FIG. 6 is a block diagram of a lines and characters separation apparatus.

FIG. 6 shows the overall arrangement of the lines and characters separation apparatus 2. In this lines and characters separation apparatus 2, the page 11 as a document is scanned by a scanner 32, and the read page 11 is recorded in a memory 33.

The scanner 32 may have a low resolution of 8 samples/mm or less. Coordinate data representing a document format detected by a page segmentor 1, i.e., coordinate data obtained by dividing the page 11 into areas having identical formats is transferred to the memory 33.

A processor 34 refers to format coordinate data in the memory 33 and divides the identical format area within the page 11 in the memory 33 into proper areas. One of these areas is transferred from the memory 33 and displayed on the display 15.

In this embodiment, images 41 (FIG. 8) multiplied by the optical system 16 for making multiple images are simultaneously input to four image detection systems 42a to 42d. The image detection systems 42a to 42d respectively comprise photosensor arrays 43a to 43d having different alignment directions and are simultaneously operated.

Figure 7:
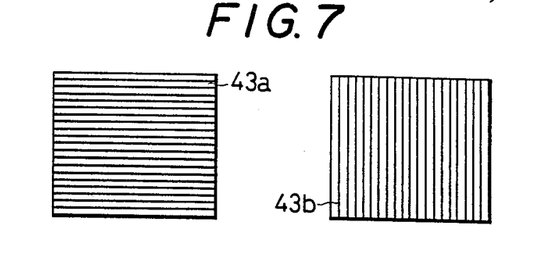
FIGS. 7 and 10 are respectively front views of photosensor arrays.

The image detection systems 42a and 42b have the photosensor arrays 43a and 43b, respectively, and serve to detect a laterally written document. The image detection systems 42c and 42d serve to detect a vertically written document.

Figure 8:
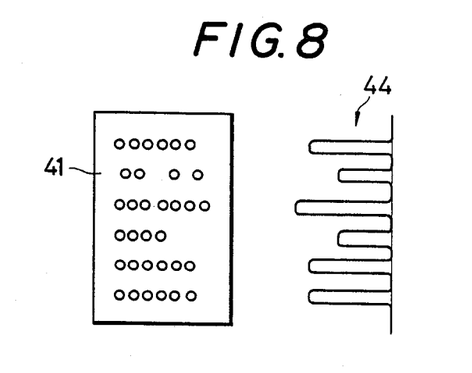
FIG. 8 is a schematic view for explaining a method of separating lines.

If a document in the multiple image 41 consists of laterally written characters as shown in FIG. 8, a photodetection output 44 having a density distribution shown in FIG. 8 is obtained from the photosensor array 43a. Line spacing is represented by a low-density portion of the photodetection output 44. The lines can be separated by a selector 45 on the basis of the photodetection output 44.

If characters in the image 41 have regular pitches in each line, photodetection output representing regular pitches is output from the photosensor array 43b as in the photodetection output 44. Therefore, separation between the characters can be simultaneously performed with separation between the lines.

Figure 9:
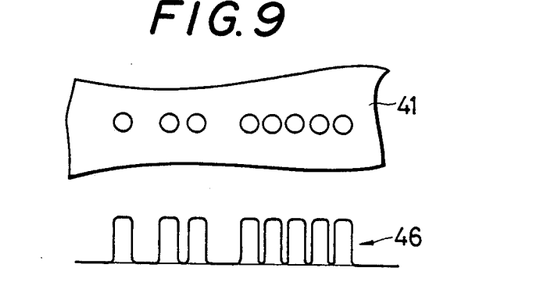
FIG. 9 is a schematic view for explaining a method of separating characters.

If the characters in the image 41 have irregular pitches in each line, as shown in FIG. 9, line separation coordinates obtained as in FIG. 8 are stored in the memory 33 by the selector 45. For each separated line, a photodetection output 46, shown in FIG. 9, is obtained again, and the characters are separated from each other by the selector 45 on the basis of the photodetection output 46.

Separation between the lines and separation between the characters in all areas within the page 11 are performed in this manner and completed.

Figure 10:
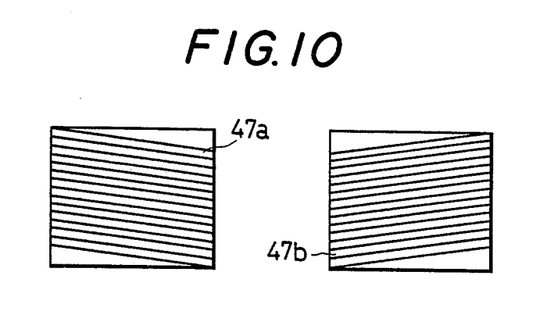

If the apparatus is constituted in such a way that a plurality of inclined photosensor arrays 47a, 47b and the like as shown in FIG. 10 are arranged, the inclination angles of the rows and columns are obtained from the photodetection outputs from the photosensor arrays 47a, 47b and the like, inclination angle data is transferred to the selector 45 through the processor 34, the selector 45 determines, on the basis of the transferred data, which one of the detection outputs from the optical detection systems 42a to 42d is employed, then, the inclined rows and the inclined columns as well as the characters in the row or column can be separated from each other.

Figure 11:
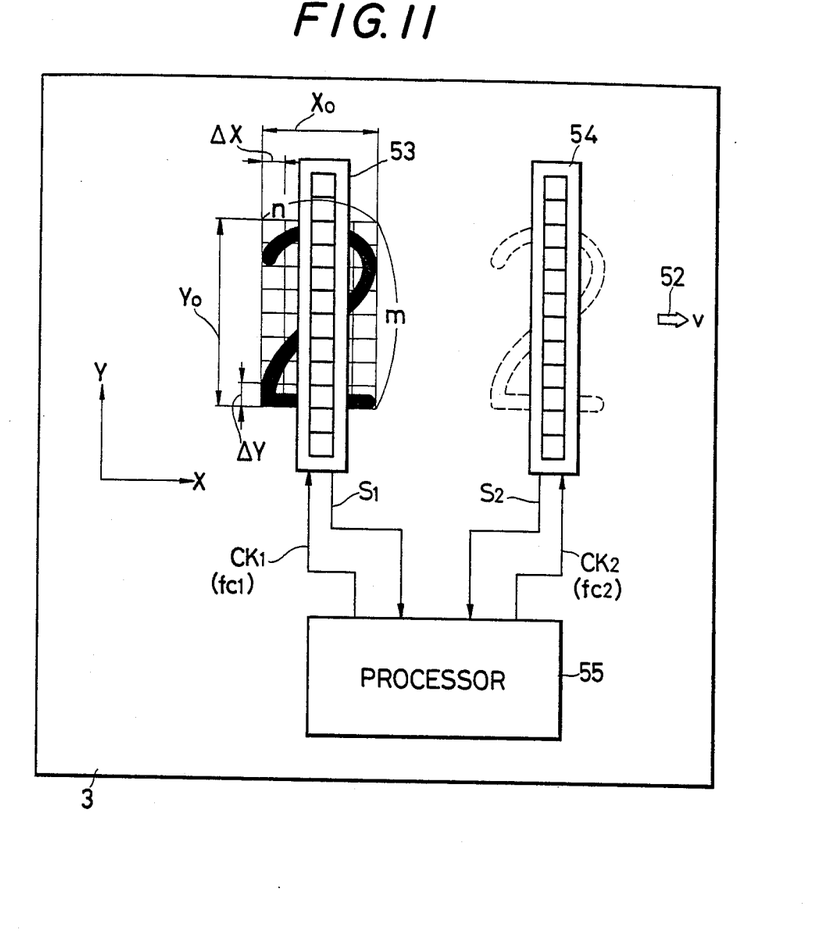
FIG. 11 is a schematic view of a character normalization apparatus.

FIG. 11 shows the overall arrangement of the character normalization apparatus 3. FIG. 11 shows a case wherein numeral "2" written on the page 11 is enlarged or reduced.

Referring to FIG. 11, numeral "2" got out by the above processes has a height $Y_0$ and a width $X_0$ and moves in a display at a speed v along the X-axis indicated by an arrow 52. One-dimensional first and second image sensors 53 and 54 made of CCDs, MOS sensors, or the like are spaced apart from each other on the display so as to have scanning direction along the Y-axis, and the numeral "2" is read by the image sensors 53 and 54 or the like.

The image sensors 53 and 54 are respectively scanned along the Y-axis in response to clocks $CK_1$ and $CK_2$ having frequencies $f_{c1}$ and $f_{c2}$ and generated by a processor 55 including a microcomputer. The frequency $f_{c1}$ is given as $f_{c1}=1/\tau$ where $\tau$ is a time required for scanning all elements of the first image sensor 53.

The image sensor 53 is scanned in response to the clock $CK_1$ to obtain an output signal $S_1$ therefrom. The processor 55 calculates the width $X_0$ and the height $Y_0$ of numeral "2" on the basis of the signal $S_1$. Numeral "2" is divided into n x m picture elements on the basis of the width $X_0$ and the height $Y_0$. If the size of one picture element determined by the element pitch of each of the image sensors 53 and 54 is defined as $\Delta X \times \Delta Y$, values m and n are defined as follows:

$$m=Y_0/\Delta Y, n=(X_0/v)\times f_{c1}$$

Assume that numeral "2" constituted by n×m picture elements is normalized to the one having a size of $n_0 \times m_0$ picture elements.

Normalization of $m \rightarrow m_0$ along the Y-axis is performed by assigning m picture elements to $m_0$ picture elements since the image sensor 53 has a sufficiently small element pitch. Normalization of $n \rightarrow n_0$ is performed by changing the frequency $f_{c2}$ of the clock $CK_2$ of the second image sensor 54 according to the magnitude of the value $X_0$ derived from the output signal $S_1$ from the image sensor 53 as follows:

$$f_{c2}=n_0/(X_0/v)$$

When numeral "2" is read again by the second image sensor 54 upon movement in the display, as indicated by the dotted line in FIG. 11, after numeral "2" is read by the image sensor 53, the frequency $f_{c2}$ is changed so as to correspond to the magnitude of the value $X_0$, thereby obtaining an output signal $S_2$ representing a normalized pattern obtained by enlarging or reducing numeral "2" along the X-axis from the image sensor 54. In this case, the frequency $f_{c2}$ is changed for each value $X_0$ of the character to be normalized.

According to the character normalization apparatus 3 described above, a character such as numeral "2" consisting of n x m picture elements can be normalized to a character consisting of $n_0 \times m_0$ picture elements. In this case, m-to-$m_0$ conversion along the Y-axis is performed by the conventional method. However, n-to-$n_0$ conversion along the x-axis can be performed by changing the clock frequency $f_{c2}$ of the image sensor 54. Therefore, the data processing amount of the computer can be greatly reduced.

Coarse scanning data obtained by the page scanner 12 in the page segmentor 1 may be obtained such that fine scanning data is obtained by the scanner 32 in the lines and characters separation apparatus 2, proper scanning strings are extracted from the fine scanning data, and that the extracted data is converted into picture elements having a low resolution.

What is claimed is:

1. An apparatus for preprocessing of character recognition comprising:
   dividing means for dividing an area within a page into a plurality of areas,
   multiplying means for multiplying one of the plurality of areas into a plurality of images,
   feature extracting means for extracting features of said one of the plurality of means by optically detecting the presence or absence of a correlation between each of pairs of the plurality of images and a plurality of different masks,
   a plurality of photosensor arrays each of which has a plurality of aligned light-receiving elements having different alignment directions and being respectively paired with the plurality of images,
   first and second image sensors for reading lines and characters within the page in a predetermined scanning direction;
   moving means for moving relatively the characters and said first and second image sensors in a direction different from the scanning direction;

calculating means for calculating a size of the characters along a moving direction on the basis of an output from said first image sensor; and control means for controlling a scanning frequency of said second image sensor on the basis of the size of the characters calculated, wherein each said one of the areas within the page is divided until each said one of the plurality of areas as directed has a single feature, and a beam from each said one of the plurality of areas with a single feature is incident on said plurality of photosensor arrays, the lines and the characters in each said one of the plurality of areas as divided are separated on the basis of a density distribution represented by detection outputs form said light-receiving elements, and each of the characters as separated is normalized by said second image sensor along the predetermined scanning direction.

2. An apparatus according to claim 1, wherein said multiplying means comprises a single convex lens having a relatively large aperture size and a plurality of convex lenses each having a relatively small aperture size, said plurality of convex lenses being aligned in a direction perpendicular to an optical axis of said single convex lens in an optical path of light passing through said single convex lens.

3. An apparatus according to claim 1, wherein said plurality of different masks include a mask for detecting a laterally written document and a mask for detecting a vertically written document.

4. An apparatus according to claim 3, wherein said plurality of different masks further include a mask having slits inclined at an arbitrary angle.

5. An apparatus according to claim 4, wherein said plurality of different masks further include a mask having a correlation with a given figure or a given table.

6. An apparatus according to claim 1, wherein said plurality of photosensor arrays include a photosensor array for detecting a laterally written document and a photosensor array for detecting a vertically written document.

7. An apparatus according to claim 6, wherein said plurality of photosensor arrays further include a photosensor array having said light-receiving elements aligned and inclined at an arbitrary angle.

8. An apparatus according to claim 1, wherein said moving means comprises a display for displaying the characters and shifting the characters in a direction perpendicular to the scanning direction.

* * * * *

UNITED STATES PATENT AND TRADEMARK OFFICE
CERTIFICATE OF CORRECTION

PATENT NO. : 4,809,344

DATED : February 28, 1989

INVENTOR(S) : Peppers et al.

It is certified that error appears in the above-identified patent and that said Letters Patent is hereby corrected as shown below:

Abstract, next to last line "proprocessing" should be --preprocessing --.

Col. 7, line 16 "form" should be -- from --.

Signed and Sealed this

Seventeenth Day of October, 1989

Attest:

DONALD J. QUIGG

Attesting Officer

Commissioner of Patents and Trademarks